United States Patent
Hofer et al.

(10) Patent No.: US 9,664,329 B2
(45) Date of Patent: May 30, 2017

(54) HYGIENIC AND ASEPTIC PIG CLEANING STATION

(71) Applicant: URESH AG, Biel-Benken (CH)

(72) Inventors: Urs Hofer, Therwil (CH); Andres Huber, Dornach (CH)

(73) Assignee: URESH AG, Biel-Benken (CH)

( * ) Notice: Subject to any disclaimer, the term of this patent is extended or adjusted under 35 U.S.C. 154(b) by 0 days.

(21) Appl. No.: 14/769,920

(22) PCT Filed: Feb. 23, 2014

(86) PCT No.: PCT/EP2014/053487
§ 371 (c)(1),
(2) Date: Aug. 24, 2015

(87) PCT Pub. No.: WO2014/128285
PCT Pub. Date: Aug. 28, 2014

(65) Prior Publication Data
US 2016/0010784 A1    Jan. 14, 2016

(30) Foreign Application Priority Data
Feb. 25, 2013  (EP) ..................................... 13156658

(51) Int. Cl.
*B08B 9/04*    (2006.01)
*F16L 55/46*   (2006.01)
(Continued)

(52) U.S. Cl.
CPC ............... *F16L 55/46* (2013.01); *B08B 3/04* (2013.01); *B08B 9/055* (2013.01); *F16L 2201/44* (2013.01)

(58) Field of Classification Search
CPC .... F16L 2201/46; F16L 2201/14; B08B 3/04; B08B 9/55; B08B 9/0555; B08B 9/0495
(Continued)

(56) References Cited

U.S. PATENT DOCUMENTS 4,199,834 A    4/1980 Jones et al.
5,300,151 A *  4/1994 Lowther ............... B08B 9/0555
                                            134/22.11
(Continued)

FOREIGN PATENT DOCUMENTS

DE    1750786 A1    4/1971
DE    9412043 U1    9/1994
GB    2348939 A    10/2000

OTHER PUBLICATIONS

International Search Report for PCT/EP2014/053487 dated Mar. 13, 2014.

*Primary Examiner* — Duy Deo
*Assistant Examiner* — Maki Angadi
(74) *Attorney, Agent, or Firm* — Dennemeyer & Associates LLC

(57) ABSTRACT

A clean-in-place launching station with cleaning chamber (2) for cleaning a pipeline pig (16) is disclosed. The cleaning chamber (2) is equipped and configured to enable the pig to be completely surrounded by turbulently flowing cleaning fluid during the cleaning process. A plunger (3) capable of axially moving the pig (16) is completely encased within the cleaning chamber. The plunger (3) has at least one internal fluid channel (10) which connects the space in front of the front end (6) of the plunger facing the pig (16) with the space behind the back end (8) of the plunger.

15 Claims, 3 Drawing Sheets

(51) Int. Cl.
*B08B 3/04* (2006.01)
*B08B 9/055* (2006.01)

(58) Field of Classification Search
USPC ....... 134/8, 22.1, 22.2; 15/104.062, 104.011; 405/104, 169, 170
See application file for complete search history.

(56) References Cited

U.S. PATENT DOCUMENTS

| | | | |
|---|---|---|---|
| 5,913,637 A * | 6/1999 | Rajabali | 137/268 |
| 7,998,276 B1 * | 8/2011 | Baugh | B08B 9/0495 134/22.11 |
| 8,146,193 B1 | 4/2012 | Franzino et al. | |

* cited by examiner

HYGIENIC AND ASEPTIC PIG CLEANING STATION

BACKGROUND

Pipeline pigs are used in a wide range of different industrial settings, typically either for the cleaning or surveying of pipelines. In terms of cleaning, pigs are usually used to push or scrape out remaining product or material in the pipeline, helping to significantly reduce the quantity of cleaning fluid required to purge and flush remnants out before a subsequent manufacturing step, and in some instances, helping to recover valuable product from the line. An effective pigging system can lead to improvements in waste management, as well as shorten the time intervals required between process steps.

The requirement for high standards of quality and hygiene in the food industry and especially in the pharmaceutical industry, where aseptic processing may be required has led to the development of pigging systems in which the pig itself can be autonomously cleaned after use without its physical removal from the system. A 'clean-in-place' set-up enables the pig to be cleaned and readied for a subsequent redeployment without the risk of introducing contaminants into an otherwise sterile pipeline environment.

Pipeline pig launching stations with integrated cleaning stations or functions are known in the art. Typically, the pigs are held in place by a pig-catching element which may or may not also be part of the mechanism for launching the pig into the pipeline.

However, complete cleaning of pigs held in pig traps can be difficult to achieve, due to limited accessibility of the cleaning fluid especially to areas of the pig in contact with the trap. Prolonged cleaning times and thus increased quantities of cleaning fluid may consequently be required, especially to remove materials strongly adhered or compacted onto the surface of the pig. Certain forms of pigs, e.g. those with ribs and those which have generally less accessible surfaces may also be more difficult to clean.

GB2348939 describes a pipeline pig launching trap with a clean-in-place arrangement wherein the pig can be subjected to a surrounding swirling action of cleaning fluid. The system is described as being particularly effective for cleaning pipeline pigs of the cylindrical form provided with groups of closely spaced resilient discs. In this apparatus, cleaning fluid enters the pig trap through a laterally extending inlet pipe connection which is merged, in a dovetail configuration, to a cylindrical body part of the trap. With such an arrangement, the fluid enters the cylindrical body tangentially, causing it to surround the full length of the pig with a swirling action. Cleaning fluid is drained, depending on the embodiment of the apparatus, through a lower-situated outlet pipe connection that is axially parallel or axially perpendicular to the inlet pipe connection. The pig trap is vertically upstanding, so that when the pig is positioned for cleaning, i.e. at its lower-most position, there is contact to a rotatable launch cam or push rod component.

It is the object of the invention to provide an improved pig launching station for a clean-in-place system which overcomes at least one of the problems and limitations associated with prior art stations, or which enables a more effective pig cleaning. Another object is to provide an improved method of cleaning a pipeline pig. Other objects will become clear on the basis of the description and the claims

SUMMARY OF THE INVENTION

The present invention provides a launching station for a pipeline pig comprising a cleaning chamber as defined in the main claim. In particular, the launching station further comprises a plunger, at least one lateral inlet and at least one lateral outlet for cleaning fluid.

The cleaning chamber has a main portion which is substantially cylindrical, has a length sufficient to accommodate the plunger and at least a portion of the pig. The cross-sectional diameter of the main portion is up to $\sqrt{2}$ times larger than the largest cross-sectional diameter of a the pig, thereby allowing the pig to be completely surrounded by fluid. Preferably, the difference is selected to be sufficient to cause the fluid surrounding the pig within the cleaning chamber to exhibit turbulent flow, taking other factors such as the type, temperature and flow rate of the fluid into account.

The plunger is axially movable within the main portion of the cleaning chamber. It has a front end facing the pig and a back end on the opposite side of the front end, and has at least one internal fluid channel which connects the space in front of the front end with the space behind the back end. The plunger is preferably mechanically disconnected from the outer surface of the launching station. Moreover, the plunger may have one or more further internal fluid channels connecting lateral openings.

The plunger may be shaped to have a substantially cylindrical main part and a front end portion which has a smaller cross-sectional diameter than the main part. It may further exhibit a back end portion with an enlarged cross-sectional diameter. Corresponding to this feature, the cleaning chamber may have a widened end portion in which the enlarged back end portion of the plunger can move axially.

The invention further provides the use of such launching station for cleaning a pipeline pig. For this purpose, cleaning fluid may be conducted into the cleaning chamber through the lateral inlet of the station. Preferably, the fluid is introduced at a flow rate which is sufficient to result in a turbulent flow of the fluid when surrounding the pig. The plunger may be moved axially during the cleaning process such as to also move the pig back and forth while the pig is surrounded by turbulently flowing cleaning fluid. The cleaning process may be conducted with the cleaning chamber, the plunger and the pig being sterile.

Further aspects and embodiments will become clear on the basis of the detailed description, the drawings and the claims.

DETAILED DESCRIPTION

Figure 1:
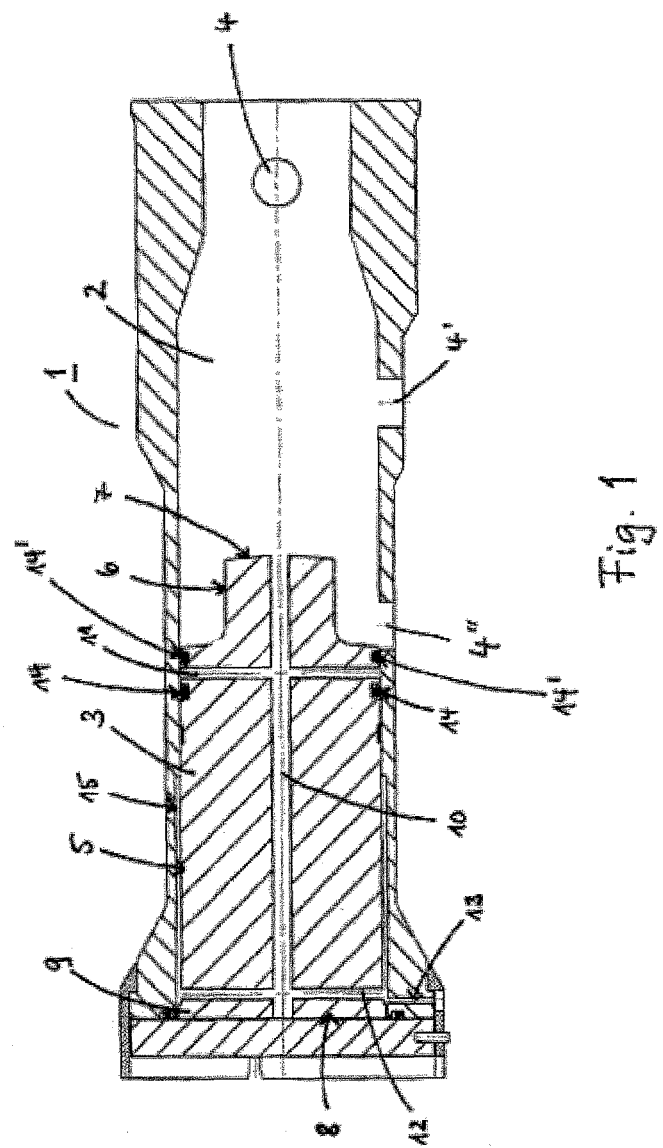
FIG. 1 shows a longitudinal vertical section of a preferred embodiment of the launching station with a cleaning chamber, the plunger being in its resting position.

In a first aspect, the present invention provides a novel launching station for a pipeline pig as defined in the main claim, with particular embodiments or optional features as provided in the dependent claims.

In particular, the launching station comprises a cleaning chamber, a plunger, at least one lateral inlet and at least one lateral outlet for cleaning fluid. The cleaning chamber has a main portion which is substantially cylindrical, has a length sufficient to accommodate the plunger and at least a portion of the pig. The cross-sectional diameter of the main portion is up to $\sqrt{2}$ times larger than the largest cross-sectional diameter of a the pig, thereby allowing the pig to be completely surrounded by fluid. The plunger is axially movable within the main portion of the cleaning chamber. It has a front end facing the pig and a back end on the opposite side of the front end, and has at least one internal fluid channel which connects the space in front of the front end with the space behind the back end.

It has surprisingly been found that the launching station as described herein enables a far more effective cleaning of a pipeline pig than has been hitherto possible without removing the pig from the pipeline system, i.e. while maintaining an aseptic environment in the system. The spatial configuration of the station allows for the pig to be positioned in the cleaning chamber without being held in place by a mechanical holding means, which means that the outer surface of the pig is completely accessible by the cleaning fluid, without any occluded or inaccessible spots. It is the flowing fluid which keeps the pig in the desired position. Moreover, the launching station with the cleaning chamber according to the invention allows for the pig to be surrounded and washed by turbulently flowing cleaning fluid. Even if the pig has a smooth form and surface, the turbulence is easily achievable in the cleaning chamber. It has been found that turbulently flowing fluid at the surface of the pig has a much better cleaning effect than fluid which exhibits lamellar flow. Thus, the invention brings about several advantages at the same time: All of the pig's surface, without exception, is cleaned, and in addition, the surface is cleaned far more effectively than according to the state of the art. There is no need to remove the pig from the pipeline system for cleaning it aseptically.

As used herein, a pipeline pig is a device suitable for moving along the inside of a pipeline in order to facilitate the transportation of material in the pipeline, to inspect the pipeline, or to clean it. A pipeline pig is sometimes also referred to as pipeline gauge or mole. Pipeline systems useful for practising the invention are in particular those which are used in the food and pharmaceutical industries for transporting raw materials, intermediate or final product. For example, the launching station as described herein may be part of a pharmaceutical production plant. In one embodiment, the pipeline system is sterile inside, and used to transport a pharmaceutical material aseptically. The internal pipe diameter may typically be in the range from about 2 cm to about 20 cm. Pigs corresponding various pipes and pipe diameters are available. Typically, the largest diameter of a pig is only minutely smaller than the inner diameter of the corresponding pipeline, such as to allow movement of the pig, but also to allow the pig to push material through the pipe.

A launching station, in the context of the invention, is defined as a station integrated within the pipeline system in which a pig may be parked without blocking the pipeline, and launched again. It may also be referred to as a pig washing station.

According to the invention, the cleaning chamber, which is an essential part of the launching station, has a main portion which is substantially cylindrical. For example, the main portion may be cylindrical with the exception of minor deviations due to openings and the like. The length of the main portion is sufficient to accommodate the plunger plus at least a portion of the pig, preferably the whole pig. Compared to that of the pipeline and thus also that of the pig, the cross-sectional diameter of the main portion is sufficiently enlarged to allow fluid to be conducted around the pig, in particular cleaning fluid, such as to surround the pig completely. The space around the pig, i.e. the difference in diameter between the main portion of the cleaning chamber and the pig should also be selected to be sufficient to achieve a turbulent flow of the fluid. The minimally required difference in each individual case would also depend on the nature of the fluid and its flow rate. Typically, however, the cross-sectional diameter of the main portion of the cleaning chamber is at least about 10% larger than the largest cross-sectional diameter of the pig. In further embodiments, the respective diameters differ by at least about 20%, or by at least about 30%.

On the other hand, the difference between the respective diameters should not be large either, such as to ensure that the turbulent flow of fluid surrounding the pig may be maintained, as well as a high velocity of the fluid at the surface of the pig. Therefore, the difference in diameters should not be larger than by the factor of $\sqrt{2}$, or approx. 1.41, relative to the largest cross-sectional diameter of the pig. In other words, if the (largest) diameter of the pig is 100 mm, the main portion of the cleaning chamber should not have a diameter of more than about 141 mm.

In the context of the invention, a plunger should be understood as a device capable of performing an axial, e.g. back-and-forth reciprocating, movement within a pipe or hollow cylinder, like a piston. The plunger should, for example, be capable of pushing a pig back into the pipeline after cleaning. The plunger is axially movable at least within the main portion of the cleaning chamber. A major part of the plunger may be shaped like a cylinder. It has a front end, or front face, facing the pig, and a back end, or back face, on the opposite side of the front end. Moreover, it has at least one internal fluid channel which connects the space in front of the front end with the space behind the back end. The channel may be positioned along the longitudinal centre axis of the plunger. Through the fluid channel, there is a fluid communication between the spaces in front of and behind the plunger, so that e.g. cleaning fluid may be conducted internally through the plunger from its back to the front, or vice versa. If conducted from the back to the front, such fluid flow could be used for maintaining a small distance between the plunger and a pig.

Optionally, the plunger has a substantially cylindrical main part and a front end portion which has a smaller cross-sectional diameter than the main part. This type of geometry is advantageous as it allows fluid to completely flow around the pig towards the plunger, where it may exit the cleaning chamber through a lateral fluid outlet in the wall of the cleaning chamber which may be positioned at or near the transition between main part and the narrowed front end portion of the plunger in its resting position, or vice versa.

Optionally, the plunger may have one or more further internal fluid channels each connecting two lateral openings of the plunger. Optionally, there may be a fluid connection between two or more channels within the plunger. If a fluid channel exists which connects two lateral openings of the plunger near its back end, it is also useful to have a corresponding fluid inlet or outlet opening in the cleaning chamber The axial movement of the plunger in the cleaning chamber may be restricted to a defined length. This may, for example, be accomplished by designing the plunger with a back end portion with an enlarged cross-sectional diameter, and the washing chamber to have a widened end portion which corresponds to the back end portion of the plunger.

The plunger may be equipped with one or more seals, such as sealing rings which may be positioned upstream or downstream of lateral openings to restrict fluid flow between the spaces in front of and behind the plunger, except through the internal fluid channel.

In a particularly preferred embodiment, the plunger is mechanically disconnected from the outer surface of the launching station. In other words, the plunger is completely enclosed within the launching station. Such plunger may, for example, be magnetically driven. In this configuration, the risk that contaminants are introduced into the internal space of the pipeline system is reduced substantially. Thus, the embodiment is particularly useful for pharmaceutical pipeline systems used in the manufacture of sterile products, where the exclusion of microbiological, viral and other contaminants is of prime importance.

As mentioned, the launching station has at least one lateral inlet and at least one lateral outlet for cleaning fluid. Obviously, depending on the actual functional configuration of the launching station, a lateral fluid inlet may also serve as a fluid outlet, and vice versa. Preferably, the launching station has at least two lateral openings, each of which may either serve as an inlet or as an outlet for fluid such as cleaning fluid, and each of which having a diameter sufficient to achieve a turbulent flow of the cleaning liquid when surrounding the pig. The minimum diameter of the openings to enable turbulent flow would also, in each individual case, depend on the nature and flow rate of the fluid and the difference in diameter between the cleaning chamber and the pig. In one of the preferred embodiments, the launching station has at least two lateral openings having a diameter of at least 10% of the diameter of the main portion of the cleaning chamber. Such opening may be positioned, as described above, in the wall of the cleaning chamber at or near the position of the front end portion of the plunger. Moreover, an opening of this type may be located slightly outside the main portion of the cleaning chamber. Cleaning fluid introduced into the launching station through one of the openings so positioned and removed through the other would flow around the pig in the cleaning chamber, surrounding it completely.

Another similar opening may be located in the wall of the cleaning chamber near the centre of the pig positioned in the cleaning chamber with the plunger in the resting position. Cleaning fluid introduced through such opening may further contribute to turbulent flow.

One or more further lateral openings, optionally with a smaller diameter, may also exist, for example in the region of the cleaning chamber close to the back end of the plunger in its resting position.

In a further aspect, the invention provides the use of the launching station as described above for cleaning a pipeline pig. Preferably, the use includes the introduction of cleaning fluid through at least one of the lateral openings at a flow rate sufficient to generate a turbulent flow of the fluid when surrounding the pig. Optionally, the plunger may be axially moved during the cleaning process such as to move the pig while the pig is surrounded by turbulently flowing cleaning fluid.

The cleaning fluid may be liquid or gaseous, or a mixture or combination of both introduced simultaneously or sequentially. Suitable cleaning fluids in liquid form may be aqueous solutions or solvents, such as organic solvents, e.g. ethanol. Moreover, the use of mixtures of ethanol and water is also contemplated. In other cases, hot water or hot diluted aqueous solutions may be used. Among the potentially useful gaseous cleaning fluids is water steam. In one embodiment, the cleaning fluid is sterile.

Sterile hot water, water steam, as well as ethanol-water mixtures may all be useful in particular for aseptically cleaning a pig within a sterile pharmaceutical pipeline system for manufacturing a sterile product.

After performing the cleaning and/or sterilisation of the pig and/or the launching station under clean-in-place (CIP) or sterilise-in-place SIP) conditions, the pig and/or the launching station may optionally be dried using filtered air or an inert gas such as filtered nitrogen.

The cleaned pig may now be pushed back into the pipeline by the plunger.

Further optional embodiments and optional features of the invention are disclosed in the drawings.

FIG. 1 shows the longitudinal vertical section of a preferred embodiment of the launching station (1) according to the invention, with a cleaning chamber (2) and a plunger (3) which is in its resting position. The launching station exhibits three lateral openings (4, 4', 4"), each of which may function either as inlet or outlet for cleaning fluid. One of the openings (4) is located outside the cleaning chamber (2), another opening (4") is located in the wall of the cleaning chamber near, or approximately at, the position of the narrowed front end portion (6) of the plunger (3). The cross-sectional diameter of the substantially cylindrical main part (5) of the plunger closely matches the internal diameter of the main portion of the cleaning chamber (2).

The plunger has an internal fluid channel (10) which connects the space in the front end (7) with the space behind the back end (8) of the plunger (3). In this particular embodiment, there is only a space for fluid behind the back end (8) when the plunger (3) is not in its resting position. A further internal fluid channel (11) connects two lateral openings near, or adjacent to, the narrowed front end portion (6), and yet another internal fluid channel (12) connects two lateral openings near the back end (8). A relatively small lateral opening (13) in the wall of the cleaning chamber (2) may serve as fluid inlet or outlet and corresponds to the internal fluid channel (12) in the rear section of the plunger.

Moreover, the back end portion (9) of the plunger (3) exhibits an enlarged cross-sectional diameter compared to the plunger's main part (5). Corresponding to the widened back end portion (9), the cleaning chamber also exhibits a widened end portion (15) allowing and restricting the axial movement of the plunger (3). Two sealing rings (14, 14') are located on each side of the internal fluid channel (11) near the front end (6).

Figure 2:
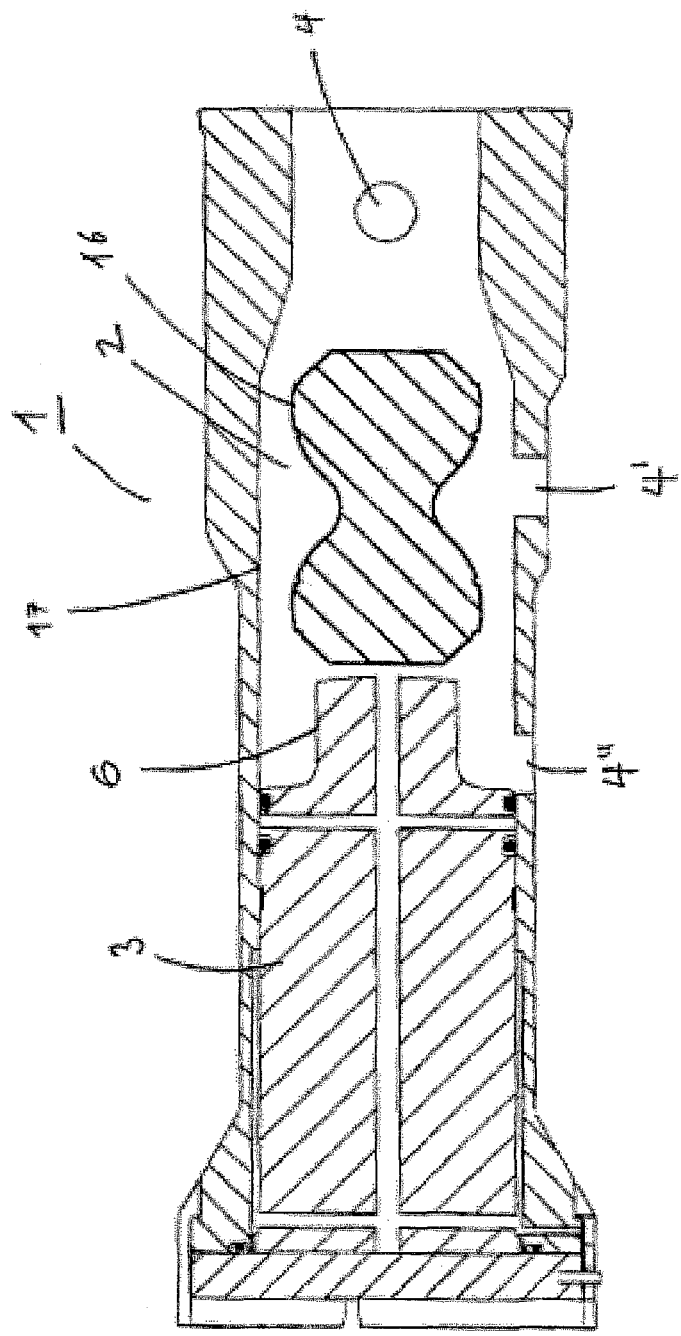
FIG. 2 shows a longitudinal vertical section of a preferred embodiment of the launching station with a cleaning chamber, again with the plunger being in its resting position, and with a pig positioned in the cleaning chamber.

FIG. 2 shows the same launching station (1) as in FIG. 1, but with a pig (16), which is almost completely located inside the cylindrical main portion (17) of the cleaning chamber (2). The cross-sectional diameter of the main portion (17) is approximately 30-40% larger than the largest cross-sectional diameter of the pig (16). Thus, cleaning fluid introduced e.g. through the lateral opening (4) just outside the cleaning chamber (2) and leaving the cleaning chamber (2) through the lateral opening (4") in the wall of the chamber (2) near the front end portion (6) of the plunger (3) can flow around the pig (16) such as to surround it completely. through the lateral opening (4') in the wall of the cleaning chamber (2) near the centre of the pig (16), additional cleaning fluid may be introduced.

Figure 3:
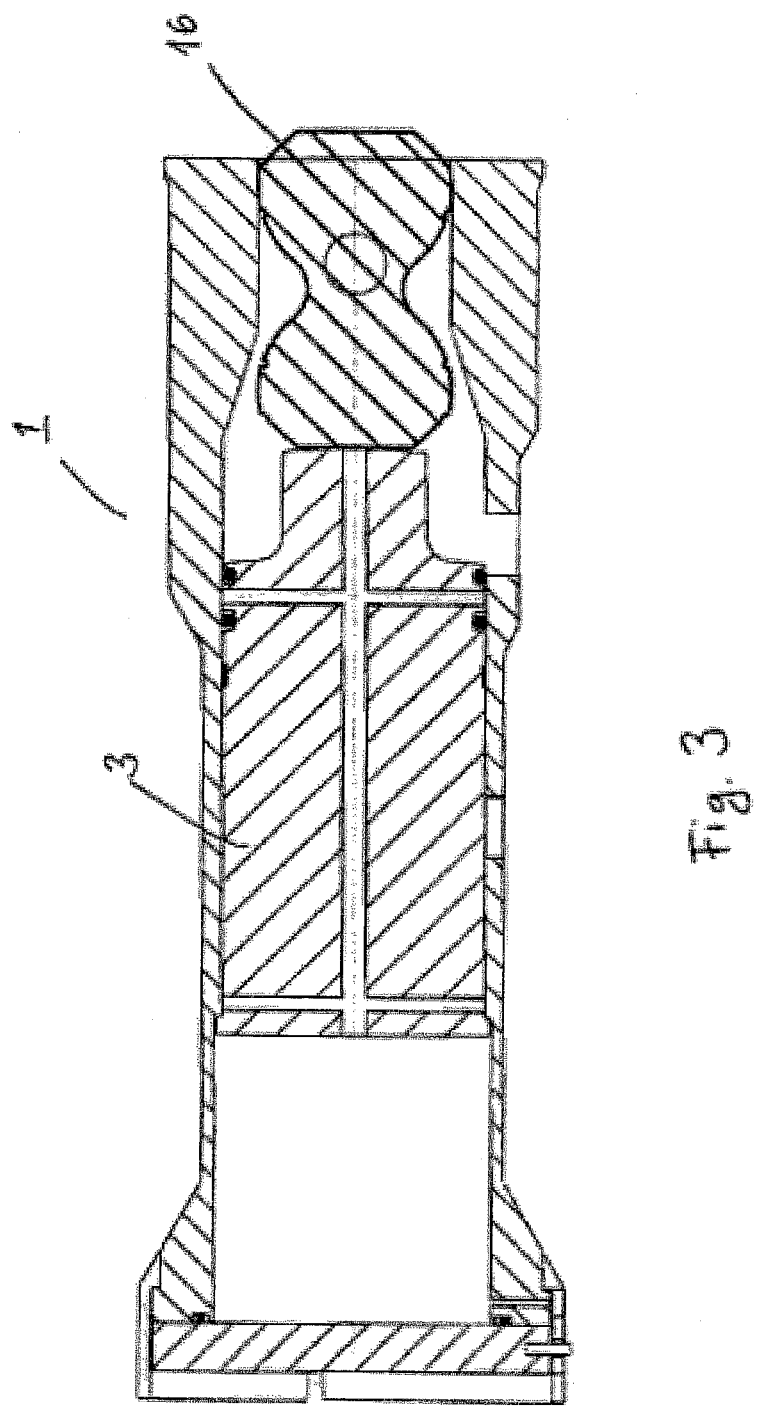
FIG. 3 shows a longitudinal vertical section of a preferred embodiment of the launching station with a cleaning chamber, wherein the plunger has axially moved such as to push the pig back into the pipeline.

FIG. 3 shows the same launching station (1) as in FIG. 1 and FIG. 2, except that the plunger (3) is no longer in its resting position, but has moved axially to push the pig (16) back into the pipeline.

The invention claimed is:

1. A launching station for a pipeline pig comprising a pig cleaning chamber for cleaning the pipeline pig, a plunger, and at least one lateral inlet and at least one lateral outlet for cleaning fluid, wherein
the pig cleaning chamber has a main portion which is substantially cylindrical, has a length sufficient to accommodate the plunger and at least a portion of the pig, and has a cross-sectional diameter which is up to $\sqrt{2}$ times larger than the largest cross-sectional diameter of a the pig such as to allow the pig to be completely surrounded by fluid; and wherein
the plunger is axially movable within the main portion of the pig cleaning chamber, has a front end facing the pig and a back end on the opposite side of the front end, and has at least one internal fluid channel which connects the space in front of the front end with the space behind the back end.

2. The launching station of claim 1, wherein the difference between the cross-sectional diameter of the main portion of the pig cleaning chamber and the largest cross-sectional diameter of the pig is sufficient to allow a turbulently flowing fluid to completely surround the pig.

3. The launching station of claim 1, wherein the cross-sectional diameter of the lateral inlet and the diameter of the lateral outlet are sufficient to achieve a turbulent flow of the cleaning fluid when surrounding the pig.

4. The launching station of claim 1, wherein the plunger has a substantially cylindrical main part and a front end portion which has a smaller cross-sectional diameter than the main part.

5. The launching station of claim 1, wherein the plunger has at least one further internal fluid channel connecting two lateral openings of the plunger.

6. The launching station of claim 1, wherein the plunger exhibits a back end portion with an enlarged cross-sectional diameter, and wherein the pig cleaning chamber exhibits a widened end portion which corresponds to the back end portion of the plunger.

7. The launching station of claim 1, wherein the plunger is mechanically disconnected from the outer surface of the launching station.

8. Use of the launching station of claim 1 for cleaning a pipeline pig.

9. The use of claim 8, comprising a step of conducting cleaning fluid into the pig cleaning chamber through the lateral inlet at a flow rate which is sufficient to result in a turbulent flow of the fluid when surrounding the pig.

10. The use of claim 8, comprising a step of axially moving plunger such as to move the pig while the pig is surrounded by turbulently flowing cleaning fluid.

11. The use of claim 8, wherein the cleaning fluid is a hot aqueous liquid.

12. The use of claim 8, wherein the cleaning fluid is water steam.

13. The use of claim 8, wherein the cleaning fluid is solvent.

14. The use of claim 8, wherein the cleaning fluid is gaseous fluid.

15. The use of claim 8, wherein the pig cleaning chamber, the plunger and the pig are sterile.

* * * * *